March 19, 1963 — C. A. DEHNE — 3,081,710
CONTROL MECHANISM FOR CONVEYOR TRACK SWITCH
Filed Feb. 24, 1961 — 3 Sheets-Sheet 1
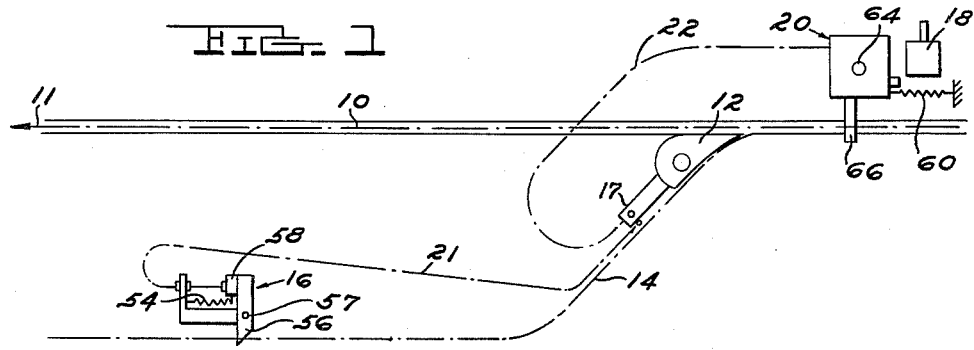
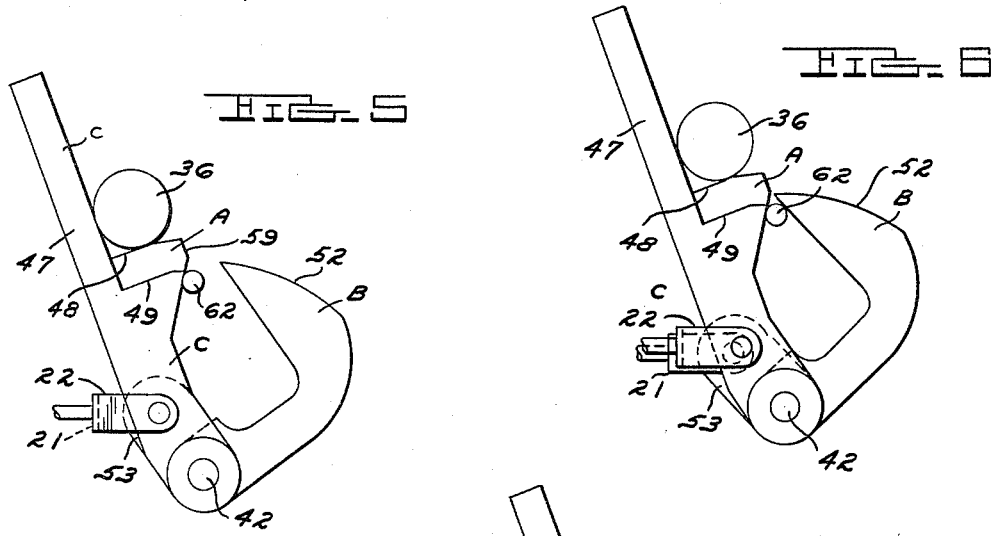
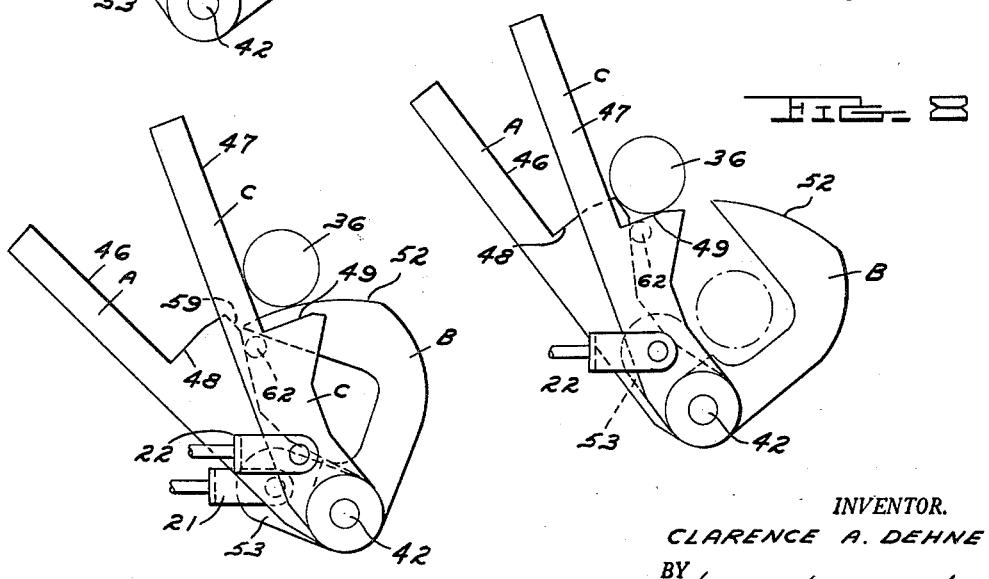
INVENTOR.
CLARENCE A. DEHNE
BY Farley, Forster & Farley
ATTORNEYS March 19, 1963
C. A. DEHNE
3,081,710
CONTROL MECHANISM FOR CONVEYOR TRACK SWITCH
Filed Feb. 24, 1961
3 Sheets-Sheet 2
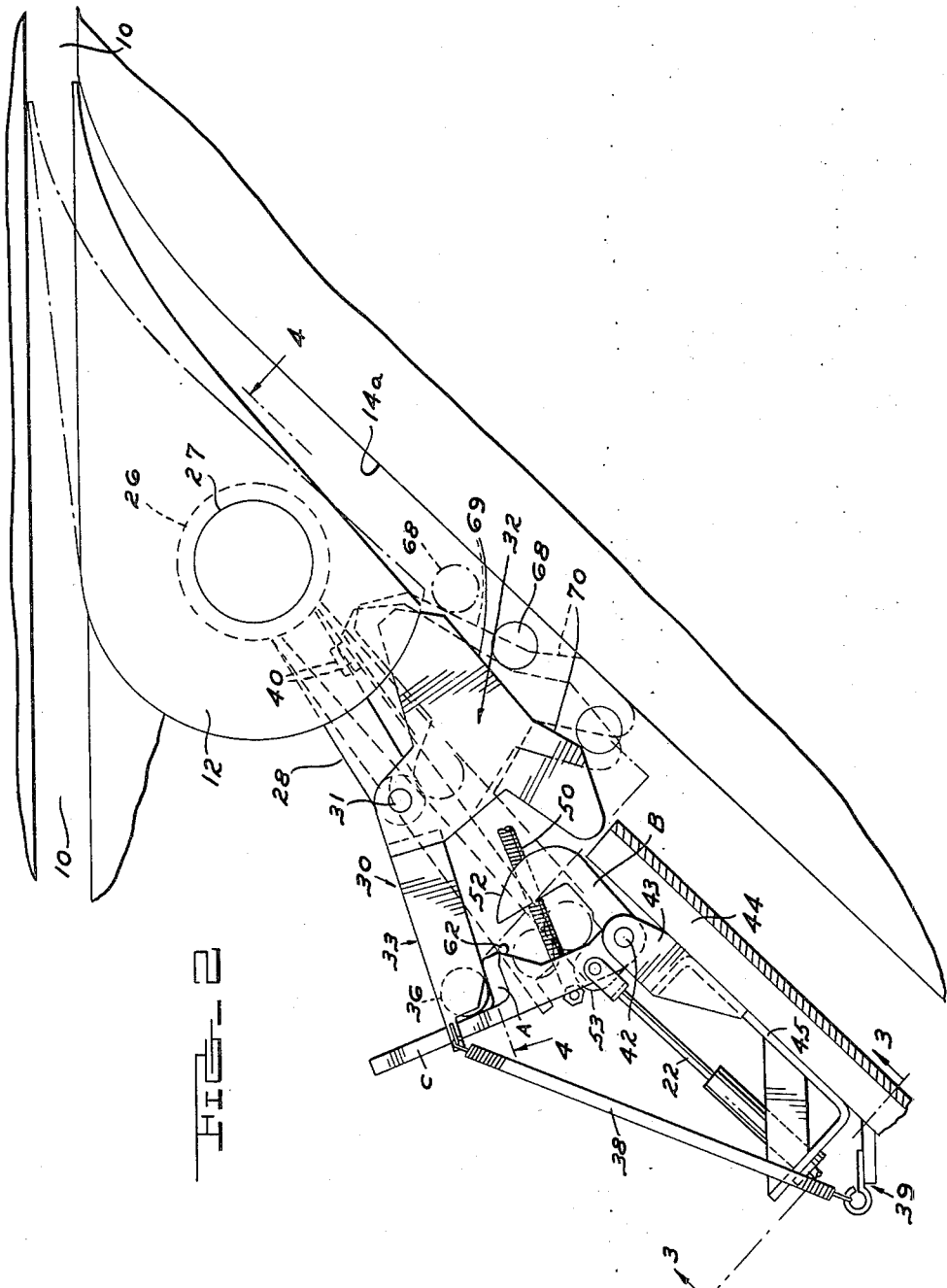
INVENTOR.
CLARENCE A. DEHNE
BY
Farley, Forster & Farley
ATTORNEYS

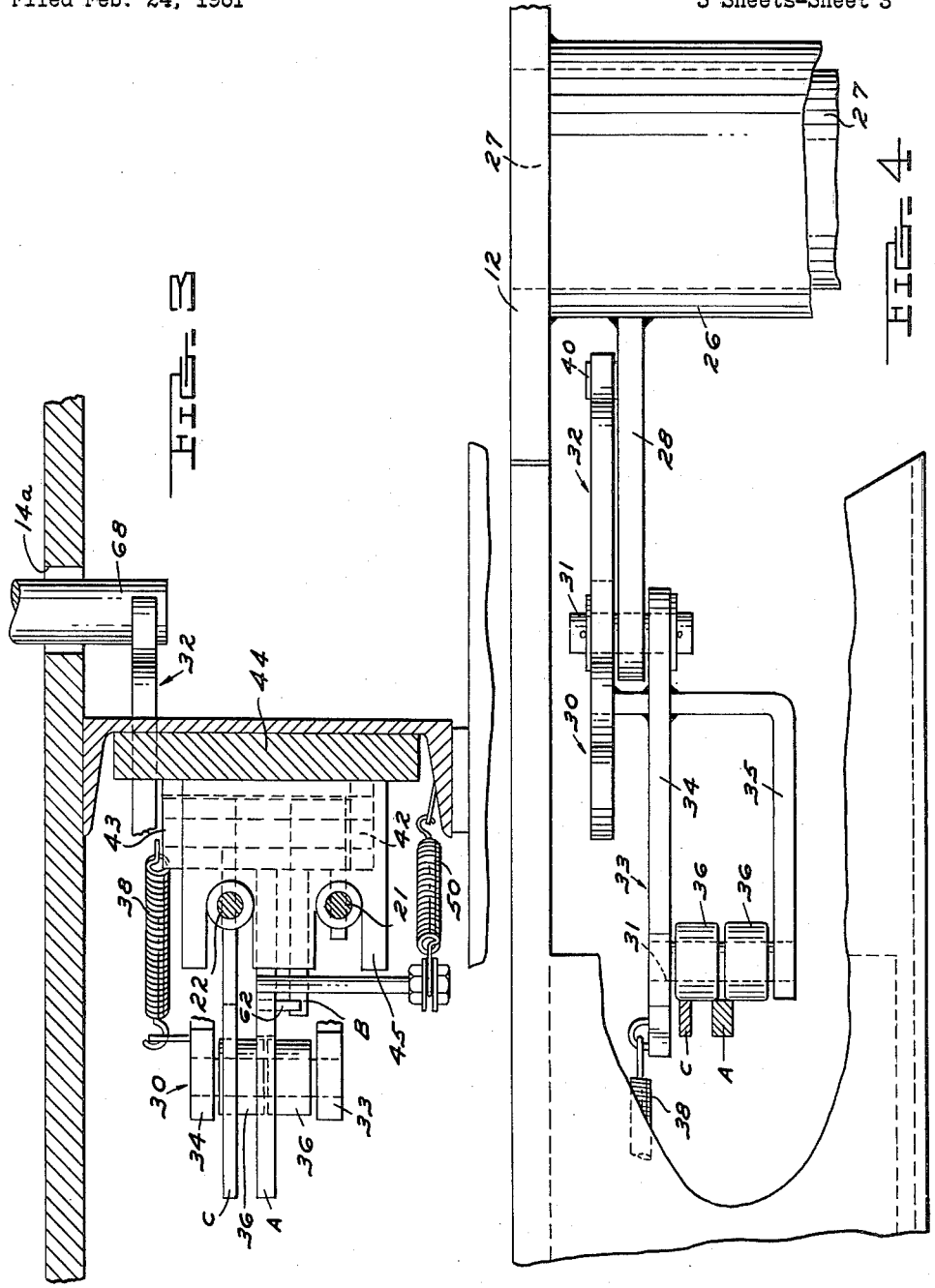

United States Patent Office 3,081,710
Patented Mar. 19, 1963

3,081,710
CONTROL MECHANISM FOR CONVEYOR
TRACK SWITCH
Clarence A. Dehne, Garden City, Mich., assignor to Jervis
B. Webb Company, Detroit, Mich., a corporation of
Michigan
Filed Feb. 24, 1961, Ser. No. 91,434
9 Claims. (Cl. 104—88)

This invention relates to an improved mechanism for controlling the operation of a two-position conveyor track switch of the type which is latched in one of its positions and normally urged to the other of its positions.

For the sake of illustration, it will be assumed that the "one" position of the switch mentioned above is such as to permit the passage of a carrier through the switch along a main line. In the "other" switch position the switch is thrown to divert a carrier onto a branch line. It is also desired that the control mechanism will permit movement of the switch tongue to diverting or branch line position only in response to both of the following conditions: (a) the passage of a preceding diverted carrier beyond a selected location on the branch line, and (b) the approach to the switch of a carrier to be diverted. The mechanism also includes means for resetting the switch to main line position in response to the passage of a diverted carrier through the switch.

In accordance with the invention a latch meachanism is provided for holding the switch in main line position against the force of suitable means such as a spring which normally acts to throw the switch to branch line position. This latch mechanism includes three latch members—a first latch member which acts to normally retain the switch in a main line position, a second latch member spring urged to a non-retaining position, and a third latch member spring urged to a switch retaining position. Preferably these latch members are arranged for sequential engagement by a latch engaging element secured to the switch tongue with a lost-motion connection. Means are provided for moving the second latch member from a non-retaining to a retaining position in response to the arrival of a preceding diverted carrier at the selected location on the branch line, together with means for moving the first latch member to a non-retaining position in response to movement of the second latch member to a retaining position. In this way, when a carrier reaches the selected branch line location, the first latch member is moved by the second latch member to a non-retaining position and the latch engaging element of the switch tongue is retained by the second latch element. This condition obtains until the preceding diverted carrier moves beyond the selected location, at which time the second latch element is returned to non-retaining position and the latch engaging element of the switch is then engaged by the third latch member. Means are further included for moving the third latch member to a non-retaining position in response to the approach on the main line of a carrier to be diverted, thereby releasing the switch tongue for normally urged movement to branch line position.

This combination of latch members positively insures desired operation of the switch tongue. Further contributing to this result is the provision of a resetting member carried by the switch tongue for pivotal movement relative thereto. The latch engaging element is carried by this resetting member which also includes a cam element adapted to be engaged by a passing diverted carrier, and having two cam portions. One cam portion is adapted, upon engagement by a passing diverted carrier, to move the switch to reset or main line position. The second cam portion is adapted to cause pivotal movement of the resetting member relative to the switch tongue to a position where the latch engaging element of the resetting member is positioned for engagement by the first latch member. The pivotal mounting of this resetting member together with the two portions provided on the cam element thereof in effect segregates the resetting movement of the switch from the resetting movement of the latching element to a latching position, and thus insures that both of these movements will properly take place with adequate provision for wear on the parts and other variables which may be encountered in service.

The mechanism of the present invention can be employed either in conveyor systems of the overhead type or the floor or dragline type. Therefore it will be understood that the terms "track" and "line" as used herein for the invention embrace either a trolley supporting track or the guide slot of a dragline system; and the term "carrier" includes the load carrying vehicle of either type of system.

A presently preferred embodiment of the invention for the floor type of system is disclosed in the accompanying drawings which includes the following views:

FIGURE 1, a schematic plan view of a switch installation showing the control elements for regulating the switch position;

FIGURE 2, an enlarged plan view of a floor type switch tongue and the control mechanism of the invention associated therewith;

FIGURE 3, a sectional elevation taken as indicated by the line 3—3 of FIG. 2;

FIGURE 4, a partial sectional elevation taken as indicated by the line 4—4 of FIG. 2; and FIGURES 5 to 8 inclusive, plan views which show in sequence the operation and relative positions of the latch members of the control mechanism.

The general setting of the invention is shown in FIG. 1 where the guide slot 10 of the main line of a conventional floor-type dragline conveyor is shown with the normal direction of travel of a carrier along this guide slot being indicated by the arrow 11. A switch tongue 12 is located at the junction of this main line 10 and a branch line 14. This switch tongue 12 is held in main line position, as shown, by the latch and control mechanism of the invention, and normally urged to branch line position by a spring as will be explained more fully hereinafter.

It is desired that movement of the switch from main to branch line position shall take place in response to movement of a diverted carrier beyond a selected location on the branch line 14, at which location a sensing unit 16 is mounted; and in response to the subsequent approach on the main line of a carrier to be diverted as sensed by a detecting unit 18 which operates a switch control unit 20. The sensing unit 16 is connected to the switch control mechanism 17 by a push-pull cable 21; likewise the control unit 20 is also connected to the switch control mechanism by a similar cable 22.

The switch and its control mechanism are shown in detail in FIGS. 2–4. The switch tongue 12 is secured to a collar 26 which is pivotally mounted on a suitably supported post 27 (FIG. 4) and an arm 28 is secured to the collar 26 so that the tongue 12 and arm 28 pivot in unison about the post 27, the arm 28 thus being a part of the switch. A resetting member generally designated 30 is secured to the arm 28 by a pivot pin 31. This resetting member includes a cam element 32 and a latch element 33 consisting of members 34 and 35 integrally connected to form a yoke-like structure which carries a pair of rollers 36. The resetting member 30 is urged in a counterclockwise direction about its pivot pin 31 by a spring 38 anchored at 39, with the extent of this movement being limited by a one-way driving connection in the form of a stop 40 carried by the arm 28 so that when the resetting member 30 engages the stop the spring produces pivotal movement of the switch tongue 12 to the diverting or branch line position shown in dash-line in FIG. 2.

The switch tongue is held in the main line position shown in full line in FIG. 2 by a latch mechanism which engages the rollers 36 carried by the resetting member 30. The latch mechanism includes three latch members, A, B and C which are all mounted in side-by-side relation on a vertical pivot pin 42 carried by a bracket 43 which in turn is secured to a plate 44. Plate 44 also supports a bracket 45 to which the ends of the casings of the control cables 21 and 22 are connected.

Latch members A, B and C are best shown in plan in FIGS. 5 to 8, latch members A and C being similarly shaped and each having an elongated terminal portion 46 and 47 respectively and a shoulder 48 and 49 respectively which acts to retain the rollers 36 of the latch element 33. These shoulders or retaining surfaces 48 and 49 are spaced unequally from the axis of the pin 42, the surface 48 of the latch member A being farther therefrom.

Latch member A is normally urged by a spring 50 to a position where its portions 46 and 48 engage the rollers 36 of the latch element 33. Latch member B, which is a hook shaped member having a retaining surface 52, includes a bell crank arm 53, and cable 21 from the sensing unit 16 is connected to this arm and to the arm 56 of the unit 16. A spring 54 (FIG. 1) normally urges the arm 56 about its pivot 57 to the position shown in full line in FIG. 1 which is defined by a stop 58, and in this position the latch member B at the other end of the cable 21 is in the non-retaining position shown in FIG. 5.

Latch member C is connected to the end of the control cable 22 from the main line control unit 20, and a spring 60, which normally urges this unit 20 to the full line position shown in FIG. 1, likewise normally urges the latch member C connected to the other end of this cable to a latch retaining position such as shown in FIG. 5.

Other details of the construction will be brought out in the following description of the operation of the switch control mechanism.

Assuming that a carrier has been diverted onto the branch line 14 and that the switch tongue 12 has been reset in main line position as indicated in FIG. 2, the switch tongue will be held in this position by the engagement of the rollers 36 with the shoulder 48 of the latch member A as shown in FIGURES 2 and 5. The parts remain in this position until the diverted carrier reaches the sensing unit 16. Arm 56 of the sensing unit is contacted by the drive pin of the floor supported carrier and pivoted in a clockwise direction as the parts are seen in FIG. 1, moving the control cable 21, and consequently moving the latch member B from the position shown in FIG. 5, thru the position shown in FIG. 6 to the position shown in FIG. 7. During this movement of latch member B, it engages a depending lug 62 (FIG. 6) carried by latch member A with the result that latch member A is moved from a latch retaining to a non-retaining position in response to the movement of latch member B to a retaining position. As latch A reaches a non-retaining position, the resetting member 30 is moved on its pivot 31 by the spring 38, placing the rollers 36 in latched engagement with the retaining surface 52 of latch member B and in blocking relation with the side portion 59 of latch member A.

When the carrier passes the sensing unit 16, spring 54 returns the sensing unit arm 56 to its normal position and in doing so returns the latch member B to a non-retaining position as shown in FIG. 8, permitting the resetting member 30 and latch rollers 36 to move into engagement with the shoulder 49 of latch member C. Thus, when the sensing unit 20 on the main line is engaged by the drive pin of the next approaching carrier to be diverted, it will be rotated about its pivot 64 by the engagement between the carrier drive pin and an actuating plunger 66 of the sensing unit. This plunger 66 is operated by a solenoid (not shown) in response to a signal received from an electrical detecting unit 18 which senses whether or not the approaching carrier is one destined for the branch line 14. Since the operation of this plunger 66 and sensing unit 18 form no part of the present invention they have not been shown in detail.

Movement of the control unit 20 about its pivot 64 operates the control cable 22 connected to latch member C, thereby moving this latch member counterclockwise from the position shown in FIG. 8 and releasing the latch rollers 36 from engagement with the shoulder 49 of the latch member C. This permits the resetting member 30 to be moved about its pivot pin 31 by the spring 38 into engagement with the stop 40 carried by the switch arm 28 and to then swing the switch to branch line position.

In branch line position the cam element 32 of the resetting member 30 projects across the branch guide slot 14a as shown in FIGS. 2 and 3 in a position to be engaged by the drive pin 68 of the diverted carrier. Cam element 32 includes two cam portions, one 69 of relatively gradual slope and a second following portion 70 of steeper slope. The first cam portion 69 is adapted upon engagement by the drive pin 68 to urge the resetting member counter-clockwise about its pivot pin 31 into engagement with the stop of the switch arm 28 thus producing clockwise motion of the switch tongue 12 back to main line position. This cam portion 69 may be considered as being disposed substantially between the axis of the pivot 27 of the switch tongue 12 and the axis of the pin 31 of the resetting member 30. The second cam portion 70 is disposed generally to the outside of the pivot 31 of the resetting arm, and when contacted by the approaching drive pin 68 causes pivotal movement of the resetting arm in a clockwise direction, thereby placing the latch rollers 36 in position to be immediately engaged by the latch member A which is normally urged to this engaging position by the spring 50. The switch is thus reset and held in reset position by the control mechanism for a repetition of the functioning sequence outlined above.

The control mechanism of the invention offers certain features and advantages among the more important of which are the following:

(a) When the switch is reset it is immediately engaged and held in reset position by the latch arm A which in this respect acts independently of the latch members controlled by the devices 16 and 20 so that any malfunction in either or both of these devices will not result in undesired movement of the switch to branch line position;

(b) If a diverted carrier should stop with its drive pin engaging the actuating arm 56 of the sensing device 16, the latch mechanism will not be placed in position so that the switch can be released by the next approaching carrier to be diverted from the main line. Instead, a preceding carrier must pass beyond the sensing device 16, releasing its arm 56 for return to the normal position before the switch is in condition to be released by the next approaching carrier;

(c) Smooth operation of the latch with relatively little wear is insured by the combination of the latch rollers 36 and the pivotal mounting of the latch members A, B and C, whose latching or retaining surfaces are in general formed about the axis of movement of the surfaces between retaining and released positions;

(d) Proper resetting movement of the switch tongue 12 and of the latch rollers 36 is insured by the dual cam surfaces of the resetting member 30. These surfaces segregate the resetting motion of the switch tongue to main line position from the overtravel motion of the resetting member 30 to a position for engagement of the latch rollers 36 by the latch members, and make it possible that both of these motions will fully take place. Cam portion 69 is designed to produce slightly more than enough resetting motion of the switch tongue 12, in order to compensate for a worn drive pin 68 or wear in any of the other parts. If the switch tongue fully returns to main line position before the drive pin reaches the end of the cam portion 69, the only effect is to earlier initiate the overtravel motion of the resetting member. Excess capacity can also be provided on the cam portion 70 because compensation for excess overtravel motion of the resetting member is furnished by the long terminal portions 46 and 47 of the latch members A and C;

(e) Opposite movement of both the switch tongue 12 and of the latch rollers and resetting member 30 results from the action of a single spring.

These, and other features and advantages will be appreciated by those skilled in this art together with the fact that modifications can be made to the structure described herein to illustrate the invention. Such modifications as are within the scope of the following claims are to be considered a part of this invention.

I claim:

1. Switch tongue position control mechanism for a conveyor carrier track system having a switch tongue pivoted at the intersection of main and branch lines and held by a latch device in main line position against the force of a shifter spring which acts to move the tongue to branch line position when the latch is released, characterized by the tongue position control mechanism including a resetting member pivotally secured to the switch tongue, a one-way driving abutment between the switch tongue and resetting member and engageable by the latter, means connecting the shifter spring to the resetting member whereby the resetting member is normally urged into engagement with the one-way driving abutment and the switch tongue thereby normally urged to branch line position, the resetting member being provided with first and second cam surfaces engageable in succession by a passing carrier when the switch tongue is in branch line position, the first of these cam surfaces being disposed in relation to the resetting member pivot to cause the resetting member to be urged into engagement with the one-way driving abutment to produce movement of the switch tongue to main line position when the first cam surface is engaged by a passing carrier, the second resetting member cam surface being adapted to produce reverse pivotal movement of the resetting member to a latching position in response to engagement of the second cam surface by a passing carrier, and a latch element carried by the resetting member, said latch element being engageable by the latch device when the resetting member is moved to a latching position.

2. Switch tongue position control mechanism according to claim 1 further characterized by the latch device including first, second and third latch members each mounted for movement between retaining and non-retaining positions with respect to the latch element of the resetting member, a spring normally urging the first latch member to retaining position for engagement by the latch element of the resetting member in the latching position thereof, means normally holding the second latch member in non-retaining position, a control device for moving the second latch member to retaining position in response to the arrival of a carrier at a selected point on the branch line and for releasing the second latch member from retaining position upon the passage of the carrier beyond such point, means for moving the first latch member to non-retaining position in response to movement of the second latch member to retaining position thereby disengaging the latch element from the first latch member and allowing it to be engaged by the second latch member, means normally holding the third latch member in retaining position for engagement by the latch element upon release of the second latch member, and a further control device for moving the third latch member to non-retaining position in response to the approach on the main line of a carrier to be diverted.

3. Switch tongue position control mechanism according to claim 2 further characterized by the first, second and third latch members being mounted for pivotal movement about a common axis and having latching surfaces located at progressively decreasing distances from this common axis for successive engagement by the latch element.

4. Switch tongue position control mechanism according to claim 3 wherein the latching surfaces of the latch members are formed in substantially arcuate relation to the axis of movement thereof.

5. A switch according to claim 1 wherein said first cam means has an operative throw in excess of that normally required to pivot said switch between the two positions thereof, said first cam means merging into said second cam means whereby any excess portion of said first cam means is operative as an extension of said second cam means.

6. A track switch according to claim 1 wherein said second cam means is provided with a throw in excess of that normally required to produce pivotal movement of said resetting member to the said latching position thereof, said latch device including a latch member having an extended terminal portion adapted to engage said resetting member in positions thereof beyond the said latching position resulting from the excess throw of said second cam means.

7. Latch mechanism for use with a two-position track switch of the type which is retained by said latch mechanism in a first position and which is normally urged to a second position to divert a carrier, said latch mechanism comprising a first latch member, a second latch member and a third latch member, means mounting each of said latch members for movement between retaining and non-retaining positions, spring means normally urging said first latch member to the said retaining position thereof, means normally urging said second latch member to a non-retaining position, first control means for moving said second latch member to a retaining position, means for moving said first latch member to a non-retaining position in response to movement of said second latch member to the said retaining position thereof, means normally urging said third latch member to a retaining position whereby said third latch member acts to retain said switch in response to the return of said second latch member to the normal non-retaining position thereof, and second control means for moving said third latch member to a non-retaining position to release said switch for normally urged movement to said second switch position.

8. Switch latch mechanism according to claim 7 further characterized by a member pivotally secured to the switch, a latch engaging element carried by said member, a one-way driving abutment between said member and said switching spring means urging said member in a direction for engagement with said one-way driving abutment, said first, second and third latch members being arranged for successive engagement by said latch engaging element on movement of said member by said spring means.

9. Switch latch mechanism according to claim 8 further characterized by the first, second and third latch members being mounted for pivotal movement about a common axis and having latching surfaces located at progressive decreasing distances from this common axis for successive engagement by the latch element.

References Cited in the file of this patent
UNITED STATES PATENTS
2,897,769    Bishop et al. _____ Aug. 4, 1959